April 29, 1958 A. H. ROSENTHAL 2,832,818

VIDEO-SIGNAL GENERATOR

Filed March 24, 1954

INVENTOR

ADOLPH H. ROSENTHAL

BY Mitchell & Bechert

ATTORNEYS

United States Patent Office 2,832,818 Patented Apr. 29, 1958

2,832,818

VIDEO-SIGNAL GENERATOR

Adolph H. Rosenthal, Forest Hills, N. Y., assignor to Fairchild Camera and Instrument Corporation, Syosset, N. Y., a corporation of Delaware Application March 24, 1954, Serial No. 418,435

18 Claims. (Cl. 178—5.4)

This invention relates to means for generating a video signal upon scanning a given field for intensity variations in said field.

In various television and related applications, as for radar-training devices, it is necessary to generate a video signal which can be fed into a television receiver or other display device. For example, in television applications a great percentage of programs originate from motion-picture film, and the video signals to be transmitted must be derived from the film. Also, in television factories or laboratories, it is desirable to produce test video signals independent of broadcast transmissions. For both these television purposes the industry has employed cathode-ray tube scanners, including film scanners and monoscope signal generators. The resulting great expense is attributable principally to the need to correct for deficiencies in the cathode-ray tube, particularly as to linearity of scan, and to overcome the characteristic limitations on resolution. In certain military applications, similar elaborate cathode-ray-tube test equipment is used.

It is, accordingly, an object of the invention to provide improved video-signal generating means of the character indicated.

It is another object to provide improved video-signal generating means having substantially better inherent resolution and linearity of scan.

It is a further object to meet the above objects with a generator that is relatively free of resolution-limiting phenomena, such as the afterglow associated with cathode-ray-tube phosphor screens.

It is also an object to provide a video-signal generator inherently applicable to the transcription of black-and-white or color films, whether scanned for field-sequential, line-sequential, or dot-sequential broadcast.

Figures 1, 2, 3, 3A, 4:
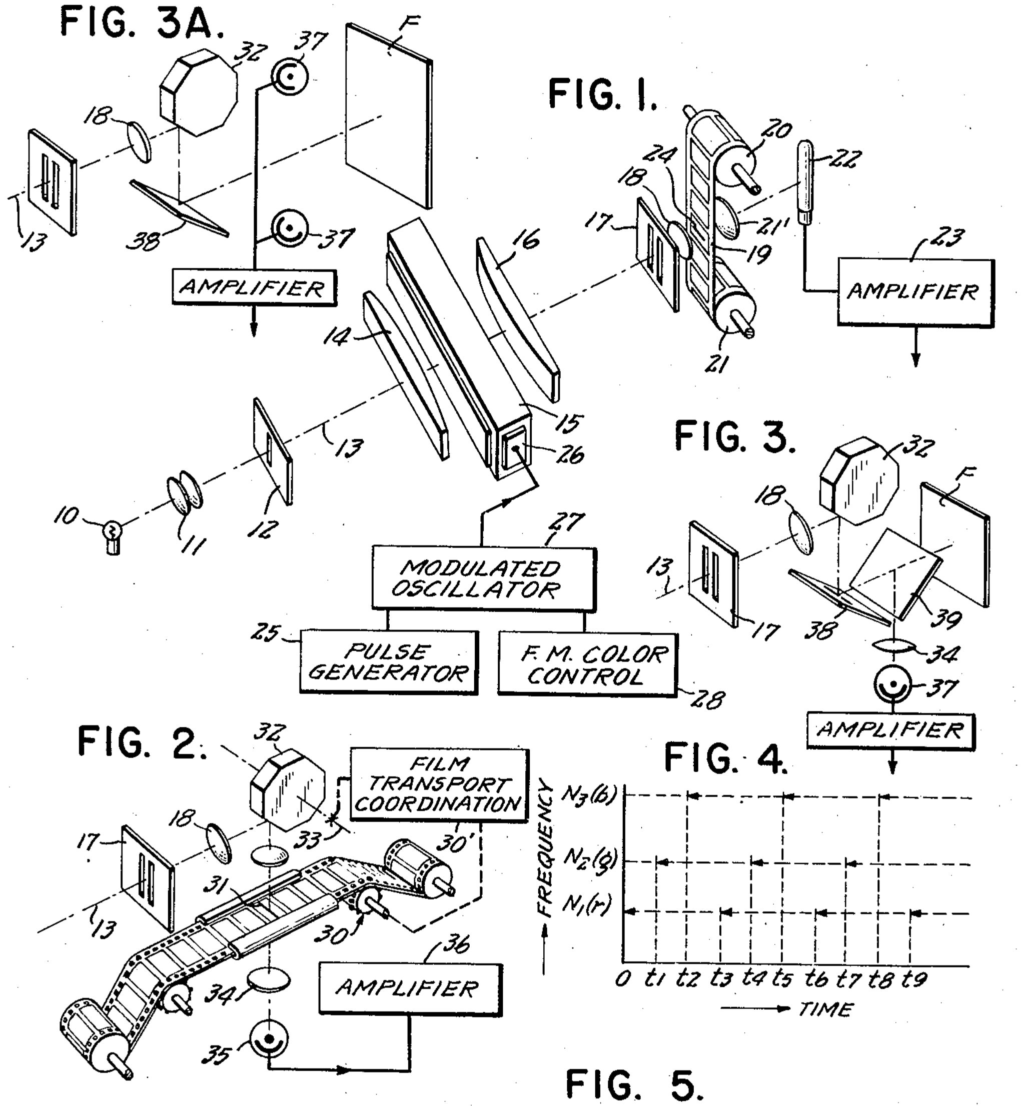
Figure 5:
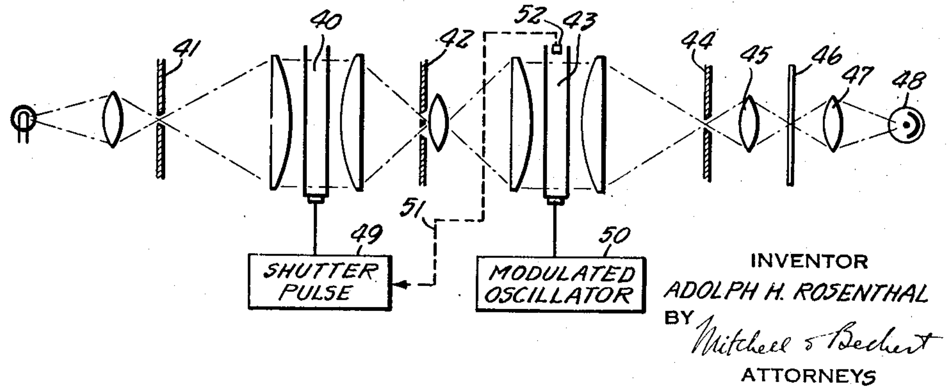

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified isometric diagram schematically showing optical elements of a video-signal generator incorporating features of the invention;

Figs. 2, 3, and 3A are fragmentary views similar to Fig. 1, but illustrating alternative constructions;

Fig. 4 is a simplified graphical presentation, descriptive of functions in my video-signal generator; and Fig. 5 is a simplified optical diagram of an alternative construction.

Briefly stated, this invention contemplates the generation of a video signal representing line-scanning of a given field. Scanning is caused to take place by the employment of a flying spot (traversing the scanning line), and by observing the reflected or transmitted intensity of the light striking the field. The flying spot is available from an optical system including an ultrasonic cell which may be of the type discussed in greater detail in my copending patent application Serial No. 217,104, filed March 23, 1951, and photoelectric means may be employed to observe the intensity modulation developed by the action of the flying spot on the field. In order to develop a frame of video signal, representing a plurality of sequential lines of scanning, means are shown for moving the field across the flying-spot axis and, alternatively, means for moving the flying-spot axis across the field. By employment of color-modulating techniques in the excitation of ultrasonic cell means, the video-signal generator is inherently applicable to the scanning of color fields, as, for example, successive frames in a color movie or individual color-slide transparencies.

The basic nature of the video-signal generator is perhaps best illustrated in Fig. 1, in which light from a source 10 is concentrated by a condenser 11 on the slit of diaphragm means 12, located on an optical axis 13. Light passing the slit of diaphragm 12 is collimated by lens 14 through the ultrasonic light-modulator cell 15, and an image of the slit of diaphragm 12 is formed by collimating lens 16 on a second diaphragm 17, containing one or more slits or bars at suitable positions; in the form shown, the diaphragm 17 has two slits, and the image of the slit of diaphragm 12 is formed on the bar between the two slits of diaphragm 17, that is, as long as cell 15 is not excited. A projection lens 18 may develop an image of the cell 15, in the form of a line across a field to be scanned, and in the form shown the field is determined by one of a plurality of successive frames in a motion-picture film 19, supported between a supply reel 20 and a take-up reel 21. Modulated light striking the field and traversing the film 19 may be directed by a further field lens 21' onto a photocell 22, and the video signal developed by the output of cell 22 may be amplified at 23, for processing as needed.

To produce a flying spot along the scan line 24, representing the image of the cell 15 on the film 19, pulse-generator means 25 are provided for periodically exciting the driving crystal 26 of the cell 15 with pulses of time duration representing a relatively small fraction of the transit time in cell 15. Because the image of the slit of diaphragm 12 is normally focused on the stop or bar between the slits of diaphragm 17, no light will pass through the system to the photocell 22 as long as the cell 15 is unexcited. But, for each pulse supplied by generator 25, the diffraction produced by the action of the travelling compressional pulse wave in cell 15 on the collimated light between lenses 14—16 will displace or spread the image of diaphragm 12 on diaphragm 17 and will thus allow light to pass to the photocell 22. For scanning a black-and-white film at 19, it is merely necessary that the pulse generator shall produce a pulse of time duration consistent with the minimum spot size required by television-broadcasting standards and that the pulse-repetition frequency be synchronized with the broadcast line frequency. The output of amplifier 23 may then directly feed the broadcast transmitter or any local receiver display circuit, depending upon the requirements.

As explained more fully in my above-identified co-pending patent application, excitation of an ultrasonic cell, as at 15, may be so controlled with respect to diaphragm slit widths or spacings as to produce color-modulated outputs. For this purpose, a given carrier-frequency excitation of the cell 15 may produce a corresponding predictable color output. The frequency modulation of cell 15 to produce color modulation can be continuous over the whole spectrum or it can be restricted to any number of definite colors. In the case of color television as presently contemplated, only three definite carriers are required to produce the necessary colors (red, green, and blue); for an ultrasonic-cell system of the character described in Fig. 1, with a focal length of lens 16 equal to 15 inches, with the distance of the two slits of diaphragm 17 from the optical axis 13 equal to 2 mm., and assuming the three primary colors (red, green, and blue) to have center wavelengths of 6200, 5400, and 4500 Angstrom units, respectively, the color-modulating carrier frequencies $N_1$, $N_2$, and $N_3$ are 13.5, 15.5 and 18.7 mc./sec., respectively.

Fig. 1 indicates schematically that the various carrier frequencies, as, for example, the three carrier frequencies discussed above, may be applied to the single crystal 26 through the medium of a modulated oscillator 27 under the control of what I term a frequency-modulation color control 28; control means 28 may be merely a step-function generator, determining a cyclical sequence of control steps for selection of particular carrier frequencies in oscillator 27, as will more clearly appear from the discussion below in connection with Fig. 4.

Thus far, and in connection with Fig. 1, the scanner and video-signal generator have been described as particularly applicable to the scanning of motion-picture film 19, wherein relative movement of the optical axis (or of the projected line 24) and the film 19 is achieved by motion of the film-advancing mechanism 20—21. The invention is, however, just as applicable to transcription of a non-moving field, as in the case of a slide transparency or, as exemplified in Fig. 2 by an intermittently advanced motion-picture film-carrying mechanism, designated generally 30, it being understood that scanning must proceed fast enough to complete a full frame for each period between film-advances. In Fig. 2 the desired relative motion between the field and the scanning line 31 is achieved by bodily displacing the scanning line, as through employment of a mirror polygon 32; polygon 32 may continuously rotate on an axis 33 generally transverse to the optical axis 13 and slightly offset therefrom and with a speed synchronized at a submultiple of the frame-repetition rate desired for television or other transcription. As in the case of Fig. 1, a projection lens 34 may focus light passing the transparency 30 onto a photocell 35, for supply to suitable amplifier or other signal-processing circuitry 36.

It will be understood, furthermore, that the arrangement of Fig. 2 is directly applicable to interlaced frame scanning, as to solve the problem of transcribing a motion picture having a frame frequency of 24 per second, to television broadcast having a frame frequency of 30 per second. By a proper coordination at 30' of film transport 30 (either continuously or intermittently) with the frame-scan rate of polygon 32, successive film frames may be scanned twice or three times alternately (as may be needed) during the field duration of the television system.

Fig. 3 illustrates a modification generally similar to that in Fig. 2, except that the photoelectric means 37 is caused to evaluate reflected light developed by a flying spot scanning an opaque field F. A stationary 45-degree mirror 38 serves to maintain an essentially horizontal scanning axis, with a beam passing through a semi-transparent, semi-reflecting means 39, so that reflected intensities representing scanning opaque fields F (such as small prints, photographs, or three-dimensional scenes, including plants, animals, etc.) may be followed by cell 37. Other parts of the arrangement of Fig. 3 correspond with those identified in Fig. 2 and have therefore been given corresponding reference numerals.

In Fig. 3A, a simpler means is shown for scanning the opaque field F. The need for semi-transparency 39 is avoided, and a plurality of cells 37 (surrounding and directed for response to field F) contribute to the video signal.

Generally, for line-sequential and field-sequential color-television systems, the above-described one-cell arrangement is adequate. For the dot-sequential color system, shutter means or pulse-immobilizing means are required as an additional element of the system. Fig. 5 illustrates how pulse immobilization or shutter action can be achieved through the employment of a second ultrasonic cell. Thus, the system of Fig. 5 may comprise a first cell 40, associated with complementary diaphragms 41—42, and condenser and collimating lenses as are characteristic of such systems; in addition, a second cell 42 with associated collimating lenses and a further diaphragm 44 is used. Projection means 45 may cast a combined image of the cells 40—43 on a scanning line in the field 46 to be scanned, and optics 47 may focus light passing the field 46 onto a photocell 48 for derivation of the desired video signal. In the absence of excitation of either cell 40—43, no light will pass through the system, but if a shutter pulse (available at 49, and of the nature described in connection with generator 25 in Fig. 1) is applied to one of the cells (40), such cell (40) will then serve to scan the image of all excitations then existing in the other cell (43). If such other cell (43) happens to be loaded with color-determining signals, then the action of the shutter pulse in cell 40 will be to produce scanning lines of desired color sequence reflecting the current color-modulated loading of cell 43. For dot-sequential operation, therefore, the modulated oscillator 50 for exciting cell 43 should be driven with a sequence of carrier frequencies, each sequenced step being of time duration reflecting the prescribed dot size and scanned by the shutter pulse of cell 40. The imaging of cell 40 onto cell 43 does not have to be at equal size or magnification one (as implied in the drawing), but may be on an enlarged or reduced scale, which may have certain advantages in relation to the line-scanning frequencies involved in a particular case.

Since cell 43 has to be filled with color-modulation signals before the scanning pulse is applied, it will be understood that the means 49 providing the shutter pulse may incorporate suitable delay for the purpose; alternatively, connection 51 suggests that a receiving transducer 52 at the delayed end of cell 43 may be responsive to attainment of a color-modulated loading of cell 43 to provide a synchronizing impulse for initiation of a line-scanning action.

In Fig. 4, I illustrate the time sequence of the color-frequency modulation on a graph depicting frequency against time, and for the case of the three frequencies $N_1$, $N_2$, and $N_3$ (identified with the three primary colors) I show equally spaced instants of time $t_1$ to $t_9$, each instant representing the start of a new primary-color excitation, as determined by successive steps of the step-function generator or color control 28. Beginning with each of these instants of time, the oscillator 27 will be controlled or conditioned for oscillation at each of the successive carried frequencies indicated, and depending upon the time spacing between instants ($t_1$—$t_2$, $t_2$—$t_3$, etc.), the flying spot projected on the field line 24 may scan the field in a field-sequential, line-sequential, or dot-sequential operation. Naturally, the sequence from one to the next frequency can be in any desired predetermined order; thus, one sequence may be $N_1$—$N_2$—$N_3$, the next may be $N_2$—$N_3$—$N_1$, and thereafter the next may be $N_3$—$N_1$—$N_2$, thereby providing color-interlace.

In the case of arrangements as in Figs. 1, 2, 3, and 3A wherein only one ultrasonic cell is used, field-sequential or line-sequential operation will be available, depending upon the sequencing time for successive colors; dot-sequential operation will not be available because once the wave pulse has left the crystal, the color-determining frequency will have been fixed for at least a whole scan line. However, in the case of Fig. 5, dot-sequential operation is available in addition to field-sequential and line-sequential operation because shutter means 49 affords a mechanism for scanning a whole line of dot-sequential color-loaded modulations in cell 43.

It will be seen that a basically simple means for deriving video signals from an optically scanned field has been described. The method of scanning is such as inherently to eliminate the non-linearity, poor resolution, and other limitations of current cathode-ray-tube methods. While the optical diagrams have all been described in conjunction with an essentially elongated optical axis, it will be appreciated that this was purely for the purpose of simplifying the description and that the various forms of the invention lend themselves to construction in compact form by employment of folding mirrors at various points in the optics. For example, the triple auto-collimation arrangement discussed in my copending application, Serial No. 261,241, filed December 12, 1951, may be employed for the substantial size reduction of the configuration of Fig. 5. In the scanning-pulse embodiment of Fig. 5, scanning and color-modulation functions are independent of each other and can, therefore, both be obtained at optimum performance.

While I have described my invention in detail for the preferred form shown, it will be understood that modifications may be made within the scope of the invention, as defined in the appended claims.

I claim:

1. A video-signal generator, comprising a scanning optical system including a source of light, optical elements responsive to light from said source and including an ultrasonic light-modulating cell and diaphragm means so oriented as to pass light from said source upon excitation of said cell, a field of varying optical quality along its coordinates, projection means utilizing light passed upon excitation of said cell and projecting an image of said cell in the plane of said field, pulse-generator means for exciting said cell, whereby a spot of light may scan a line across said field, and photoelectric means responsive to light striking said field.

2. A generator according to claim 1, in which said field is a transparency of varying opacity along its dimensions, and in which said photoelectric means is disposed behind said transparency and is therefore responsive to the varying intensity of light passing through said transparency.

3. A generator according to claim 1, in which said photoelectric means is on the same side of said field as is said optics and is responsive to light originating from said optics and reflected with varying intensity from said field.

4. A video-signal generator, comprising a source of light, an ultrasonic light-modulating cell, optics including said cell and including diaphragm means effective upon excitation of said cell to control the passage of light, means for supporting a photographic transparency in a given projection plane, projection means for projecting an image of said cell in said plane with light passed upon excitation of said cell, pulse-generator means for exciting said cell with pulses of substantially uniform amplitude, whereby a substantially uniform spot of light scans a line in said transparency, photoelectric means responsive to light passing through said transparency, and means for producing a relative movement of said transparency and of the projected image of said cell on said transparency.

5. A video-signal generator, comprising a source of light, an ultrasonic light-modulating cell, optics including said cell and including diaphragm means effective upon excitation of said cell to control the passage of light, means utilizing light controlled by said cell and diaphram means and projecting an image of said cell across field to be scanned, pulse-generator means for exciting said cell with pulses of susbtantially uniform amplitude, whereby a substantially uniform spot of light scans a line in said field, photoelectric means responsive to light striking said field, and means for producing a relative movement of said transparency and of the projected image of said cell on said transparency.

6. A generator according to claim 5, in which such relative movement is achieved by displacement of said field with respect to the relatively fixed projected image of said cell.

7. A generator according to claim 5, in which such relative movement is achieved upon movement of the projected image of said cell with respect to a relatively fixed field.

8. A video-signal generator, comprising a source of light, an ultrasonic light-modulating cell, optics including said cell and including diaphragm means effective upon excitation of said cell to control the passage of a predetermined color component of the spectrum formed by said cell, a field to be scanned, projection means utilizing light controlled by said cell and projecting an image of said cell in the plane of said field, means for exciting said cell at a given carrier frequency determining a particular color output of said optics, means for periodically intensity-modulating said frequency with a uniform-amplitude pulse of duration substantially less than the transit time in said cell, whereby a uniform spot of colored light may periodically scan a line in said field, and photoelectric means responsive to light striking said field.

9. A video-signal generator, comprising a source of light, an ultrasonic light-modulating cell, optics including said cell and including diaphragm means effective upon excitation of said cell to control the passage of a predetermined color component of the spectrum formed by said cell, a field to be scanned, projection means utilizing light controlled by said cell and projecting an image of said cell in said field, carrier-frequency-oscillator means for exciting said cell successively at each of a plurality of separate carrier frequencies respectively determining different color outputs of said optics, said last-defined means including control means changing the oscillator output from one of said carrier frequencies to the next succeeding of said carrier frequencies in a step-function program in which each step is of duration substantially exceeding the transit time in said cell, pulse-generator means for exciting said cell with a plurality of substantially uniform pulses for each of said steps, whereby a plurality of successive lines in said field may be scanned by successive spots of one color before progressing to successive spots of another color, and photoelectric means responsive to light striking said field.

10. A video-signal generator, comprising a source of light, an ultrasonic light-modulating cell, optics including said cell and including diaphragm means effective upon excitation of said cell to control the passage of a predetermined color component of the spectrum formed by said cell, carrier-frequency-oscillator means for exciting said cell and producing a succession of different carrier frequencies each determining a different color output of said optics, a field to be scanned, projection means utilizing the various color outputs of said optics and projecting with said outputs an image of said cell in said field, means for pulse-modulating said oscillator with a different one of said carrier frequencies for each successive pulse, said pulses being of substantially uniform amplitude for each color-determining frequency, whereby successive spots of light scanning said field may be of different but uniform-intensity colors, and photoelectric means responsive to light striking said field.

11. A video-signal generator comprising a source of light, an ultrasonic light-modulating cell, optics including said cell and including diaphragm means effective upon excitation of said cell to control the passage of a predetermined color component of the spectrum formed by said cell, a field to be scanned, projection means for projecting an image of said cell in the plane of said field, carrier-frequency-oscillator means for exciting said cell and producing a succession of different carrier frequencies each determining a different color output of said optics, the succession of such carrier frequencies being in a rapid sequence repeating over a period of time representing a relatively small fraction of the transit time in said cell, whereby at any one instant of time said cell is loaded with a plurality of different color-determining frequencies so that the projected image of said cell is a succession of different colors in a line, means for scanning the succession of different colors in said line, and photoelectric means responsive to the light developed upon optically scanning the colors in said line.

12. A generator according to claim 11, in which said scanning means includes a second ultrasonic light-modulating cell, and pulse-generator means for exciting said cell with a scanning pulse.

13. A video-signal generator, comprising a source of light, optics responsive to light from said source and including a ultrasonic light-modulating cell and diaphragm means so oriented as to pass light from said source upon excitation of said cell, a field to be scanned, projection means utilizing light controlled by said cell project an image of said cell in the plane of said field, photoelectric means responsive to light striking said field, carrier-frequency-oscillator means for exciting said cell with a color-producing frequency, the amplitude of excitation at said frequency being substantially uniform as long as said cell is excited at said frequency, and shutter means having an effective time opening representing a small fraction of the transmit time in said cell.

14. A generator according to claim 13, in which said shutter means comprises a second ultrasonic cell, and means for exciting said second cell with a pulse of time duration representing a small fraction of the transit time in said cell.

15. A video-signal generator, comprising a source of light, optics responsive to light from said source and including an ultrasonic light-modulating cell and diaphragm means so oriented as to pass light from said source upon excitation of said cell, a field to be scanned, projection means utilizing light controlled by said cell and projecting an image of said cell in the plane of said field, a carrier-frequency oscillator for exciting said cell, the amplitude of excitation at a given color-determining frequency being substantially uniform as long as said cell is excited at said frequency, whereby a given color reflecting said frequency and of uniform intensity is produced by said optics, and photoelectric means responsive to light striking said field.

16. A generator according to claim 3, in which said photoelectric means comprises a plurality of photoelectric cells off the axis of light from said optics and yet responsive to light reflected from said field.

17. A generator according to claim 3, in which said projection means includes a semi-transparent semi-reflecting member interposed between said optics and the field and inclined to the predominant axis thereof, said photoelectric means being responsive to light reflected by said member.

18. A generator according to claim 14, in which means responsive to pulse transit in said first cell is connected in triggering relation with said second cell.

References Cited in the file of this patent

UNITED STATES PATENTS

| | | |
|---|---|---|
| 2,163,540 | Clothier | June 20, 1939 |
| 2,330,172 | Rosenthal | Sept. 21, 1943 |
| 2,513,520 | Rosenthal | July 4, 1950 |